United States Patent [19]

Richards

[11] Patent Number: 5,291,462

[45] Date of Patent: Mar. 1, 1994

[54] OPTICAL DISK HAVING PLAYBACK PARAMETERS RECORDED THEREON AND METHOD FOR USING SAME

[76] Inventor: Robert E. Richards, P.O. Box 56527, Atlanta, Ga. 30343-0527

[21] Appl. No.: 606,534

[22] Filed: Oct. 31, 1990

[51] Int. Cl.$^5$ .............................................. G11B 13/04
[52] U.S. Cl. ......................................... 369/13; 369/14
[58] Field of Search ...................... 369/14, 13; 360/59, 360/114

[56] References Cited

U.S. PATENT DOCUMENTS

| | | | |
|---|---|---|---|
| Re. 30,416 | 10/1980 | Yasunaga | 360/72.1 |
| 4,210,785 | 7/1980 | Huber et al. | 360/12 |
| 4,210,940 | 7/1980 | Prysby et al. | 360/33 |
| 4,496,993 | 1/1985 | Sugiyama et al. | 358/325 |
| 4,627,038 | 12/1986 | Abed et al. | 369/44 |
| 4,680,748 | 7/1987 | Kobayashi | 369/77.1 |
| 4,706,237 | 11/1987 | Nakayama | 369/75.1 |
| 4,730,299 | 3/1988 | Kamoshita et al. | 369/264 |
| 4,740,938 | 4/1988 | Bierhoff et al. | 364/32 |
| 4,779,252 | 10/1988 | Custers et al. | 369/32 |
| 4,817,068 | 3/1989 | Yamauchi | 369/30 |
| 4,862,439 | 8/1989 | Ando et al. | 369/30 |
| 4,872,151 | 10/1989 | Smith | 369/14 |
| 4,873,586 | 10/1989 | Ishikawa et al. | 358/342 |
| 4,894,814 | 1/1990 | Yamada et al. | 369/19 |
| 5,197,048 | 3/1993 | Yoshimoto et al. | 360/114 |

FOREIGN PATENT DOCUMENTS

| | | | |
|---|---|---|---|
| 60-55526 | 3/1985 | Japan | 369/14 |
| 60-57558 | 4/1985 | Japan | 369/14 |
| 63-108539 | 5/1988 | Japan | 360/114 |
| 8403756 | 7/1986 | Netherlands | 369/14 |

OTHER PUBLICATIONS

Hoagland, "Video Disk with updating feature", IBM Tech. Discl. Bulletin, vol. 22, No. 3, Aug. 1979, p. 1183.
Jordan, "Optical/Magnetic Storage Disk System", IBM Tech. Discl. Bulletin, vol. 25, No. 2, Jul. 1982, pp. 459-460.

*Primary Examiner*—Hoa T. Nguyen
*Attorney, Agent, or Firm*—Jones & Askew

[57] ABSTRACT

There is disclosed an improved optically readable disk having an optically readable portion arranged on said disk so as to be readable by an optical reading unit and a magnetically readable and writable portion arranged on said disk so as to be both readable and writable by a magnetic read/write unit. The magnetically readable and writable portion of the disk preferably includes data or information recorded thereon defining a desired playback parameter and/or sequence for the data or information optically recorded on the optically readable portion of the disk. Also disclosed is an improved optical disk playback apparatus comprising a drive unit for rotatably driving an optical disk, an optical reading unit operatively arranged for reading data optically recorded on said disk as said disk is rotated and a magnetic read/write unit operatively arranged for both magnetically reading data from and magnetically writing data to a magnetically readable and writable portion of said disk as said disk is rotated. An improved method of playing back data or information optically recorded on a magneto-optical disk is also disclosed.

20 Claims, 3 Drawing Sheets

OPTICAL DISK HAVING PLAYBACK PARAMETERS RECORDED THEREON AND METHOD FOR USING SAME

FIELD OF INVENTION

The present invention relates generally to an improved optical disk playback system and, more specifically, to an improved optical disk including both an optically readable portion and a magnetically readable and writable portion and to an improved optical disk playback unit which includes an optical reading unit for reading optically readable portions of said improved optical disk and a magnetic reading and writing unit for reading from and writing to said magnetically readable and writable portions of said improved optical disk. The present invention also relates to an improved method for playing back said improved optical disk and/or playing back select portions of said improved optical disk in a desired sequence.

BACKGROUND OF THE INVENTION

Optically readable disks and mechanisms for playing back optically readable disks are well known in the art. Optically readable disks are produced in various forms and formats and are known by various terms in the art. Optically readable disks which include optically readable audio signals or data (such as PCM audio data) digitally recorded thereon are generally known as compact disks or "CDs." Optically readable disks which include both optically readable audio and video signals or data (frequently referred to as CD-V, CLV and CAV) digitally recorded thereon are generally known as laser disks. Optically readable disks which include computer data digitally recorded thereon are generally known as compact disk read only memory or "CD-ROM." Optically readable disks which include computer data which can be written to or recorded on a disk once and read many times are generally known in the art as write once read many disks or "WORM" disks. Optically readable disks which can be written to several times and read several times are known as magneto-optical disks.

Playback mechanisms for each of these foregoing optically readable disks are also well known in the art. Those mechanisms each include, among other things, means for rotating said optically readable disk and an optical read unit for reading the optically readable data or information recorded on said optically readable disk. Optical read units for reading the optically readable data or information recorded on said optically readable disks generally include a laser light source for illuminating the optically readable data or information recorded on said optically readable disks and a light detector for detecting the laser light reflected from the surface of said optically readable disks. The variation of the light detected by the light detector can be translated into digitally readable signals which can thereafter be decoded into digital computer readable data, digital or analog video signals and/or digital or analog audio signals. Examples of such optically readable playback mechanisms are disclosed in U.S. Pat. Nos. 4,680,748; 4,817,068; 4,627,038; 4,730,299; 4,706,237; 4,740,938; 4,873,586 and 4,894,814 (the disclosures of which are all incorporated herein by reference).

Magneto-optically readable and writable disks and playback/recording units are well known in the art, such as those disclosed in U.S. Pat. No. 4,862,439 (the disclosure of which is incorporated herein by reference). Such a magneto-optical recorder/player includes an optical head and a magnet oppositely mounted with the recordable disk placed therebetween. The magnet applies a magnetic field to the recordable disk for information recording and erasure using the magneto-optical effect. Such disks and recorder/players permit the optical recording, erasure and rerecording of optically readable data or information, such as musical selections, computer data and the like.

Optically readable disks have revolutionized the video, audio and computer industry. Optically readable disks have many advantages over other previously known recorded playback media, such as vinyl records, video tape, audio tape computer tape and computer disks (magnetic floppy disks and hard disks). The information storage density of optically readable disks is relatively high. Also, the integrity of the data or information recorded on optically readable disks is not degraded by repeated reading of said data or information from said optically readable disk. Additionally, digital data or information recorded on optically readable disks is often better suited for recording and/or reproducing original source material. Specifically, optically readable disks can reproduce audio and/or video signals better than analog recording media because of the greater dynamic range which can be recorded and reproduced on a digitally recorded optically readable disk. Computer applications of optically readable disks have permitted the relatively permanent storage of vast amounts of information or data in a relatively compact storage medium. Furthermore, for certain optically readable disks, the data or information recorded thereon is not erasable by conventional means. Accordingly, optically readable disks and mechanisms for playing back the data or information recorded on said optically readable disks are in great demand.

Optically readable disks and the mechanisms for playing back the information recorded on said optically readable disks, however, have several disadvantages. Since the data or information recorded on said optically readable disks is permanently recorded on said disks (except magneto-optical disks), the order of said data or information on said optically readable disks cannot be altered. Furthermore, with the exception of "WORM" disks and magneto-optical disks, additional data or information cannot be recorded on said optically readable disks after said disks are initially prepared. Additionally, although data or information recorded on said optically readable disks can be optically read from said disks and recorded on a separate magnetically recordable media, such as onto a magnetically recordable disk (such as a floppy disk or a hard disk), magnetically recordable tape or magnetic random access memory, such separate recording media can become lost or is difficult to associate with the optically readable disk from which said data or information was taken.

Another specific problem exists with respect to compact disks having musical selections or audio information recorded thereon. Music compact disks, as they are commonly produced today, include multiple musical selections recorded thereon. For example, a popular music compact disk may include between six and twenty different musical selection recorded on a single compact disk. A classical compact disk may also include multiple selections or may include a single musical selection. For long musical selections, such as classical music, some compact disks include recorded index points which separate the single musical selection into separate segments, such as separating a classical selection into separate movements.

In playing back the musical selections recorded on a compact disk, it is sometimes desirable to alter the sequence of the playback of the musical selections from the order that said selections were originally recorded on said compact disk. For example, one may desire to play the different selections in a different order, to play one or more selections one or more times in a playback sequence or to skip certain selections on said compact disk during a playback session.

The desirability of altering the playback sequence of data or information recorded on recording media, such as an optically readable disks, specifically musical compact disks, has been recognized in the art. For example, U.S. Pat. Nos. 4,210,940 and 4,210,785 disclose methods and apparatus for playing back in a desired sequence segments of prerecorded tapes, such as video tape.

Similarly, compact disk players (Compact Disk Digital Audio Systems) are well known in the art to be user programmable so as to play back portions of the music recorded thereon in a desired sequence. For example, U.S. Pat. Nos. 4,894,814 and 4,740,938 disclose compact disk players which can be programmed by the user to play back musical selections in a desired sequence. Generally, such compact disk players include an input unit, a logic processing unit, a memory unit and a disk reproducing unit. Within the disk player, the input unit comprises, for example, a plurality of key switches (keypad or keyboard) for entering a number representing the position of a selected piece of music on the optically readable disk to the logic processing unit. By use of the key switches, a user enters numbers corresponding to the positions of the music which one wishes to reproduce (listen to) in a desired order. The logic processing unit is, for example, a microprocessor and it transmits input signals from the input unit to the memory unit for storage and later read out. The memory unit comprises, for example, read only memories for storing an operation program and random access memories for storing data and the input signals from the key switches. The disk reproducing unit controls the position of a pick-up device relative to the disk for orderly reproduction of the data on the disk, such as music, as requested from the memory unit.

Although such prior art optical disk playback units permit a user to temporarily program a desired sequence of playback of the data recorded on optical disk, such devices must be reprogrammed when a different optical disk is inserted in the player or after the electrical power has been turned off. In other words, the optically readable disk player must be reprogrammed each time a disk is inserted into it.

The disadvantage of having to reprogram an optically readable disk player for a playback sequence for each different optical disk has also been recognized in the art. For example, U.S. Pat. No. 4,779,252 (the disclosure of which is incorporated herein by reference) discloses a compact disk player which stores in nonvolatile memory multiple playback sequence programs for different compact disks. The compact disk player reads unique subcodes prerecorded on compact disks to associate a particular compact disk with a particular program sequence stored in the player's memory. The player then retrieves the desired program sequence from its memory and executes said program sequence for playing back the compact disk inserted therein.

Although a compact disk playback system, such as disclosed in U.S. Pat. No. 4,779,252, permits multiple program sequences to be stored in memory for later use with the corresponding compact disk, such a system is not completely desirable and has several disadvantages. Such an optical disk playback system is usable only for a particular preprogrammed optical disk player. In other words, if a compact disk which had a program sequence stored in a particular playback unit, such as a home unit, is played back in a different playback unit, such as a playback unit located in an automobile or a portable playback unit, the other playback unit would have to be reprogrammed with the desired playback program sequence. The disadvantages of such a system are apparent.

Furthermore, the optical disk playback systems disclosed in U.S. Pat. Nos. 4,894,814; 4,740,938 and 4,779,252 only store playback sequence data. Heretofore, it has been unknown in the art to store on an optically readable disk user selectable playback parameters, such as program sequence, volume settings, equalization settings, bias settings, brightness settings, color balance settings, contrast settings and the like. Additionally, it has been heretofore unknown in the art to readably and writably record or store on an optically readable disk data relating to the playback of said optically readable disk, such as search logic for CD-ROMs, user alterable software for optical disk playback, select segments of data read from said optical disk and the like.

SUMMARY OF THE INVENTION

The present invention satisfies the above-described needs by providing an improved optical disk, an improved optical disk playback system and an improved method of playing back optical disks. The improved optically readable disk of the present invention comprises a rotatable disk having an optically readable portion arranged on said disk so as to be readable by an optical reading unit and a magnetically readable and writable portion arranged on said disk so as to be both readable and writable by a magnetic read/write unit. The magnetically readable and writable portion of the disk preferably includes data or information magnetically recorded thereon defining a desired playback parameter or sequence for the data or information optically recorded on the optically readable portion of the disk.

The improved optically readable disk playback apparatus of the present invention comprises a drive unit for rotatably driving an optically readable disk, an optical reading unit operatively arranged for reading data optically recorded on said disk as said disk is rotated and a magnetic read/write unit operatively arranged for both magnetically reading data from and magnetically writing data to a magnetically readable and writable portion of said disk as said disk is rotated.

The method of playing back an optically readable disk in accordance with the present invention comprises the steps of rotating an optically readable disk having data or information optically recorded on an optically readable portion of said disk and having data or information magnetically recorded on a magnetically readable and magnetically writable portion of said disk, reading said magnetically readable data or information magnetically recorded on said magnetically readable and writable portion of said optically readable disk, and optically reading said optically readable data or information recorded on said optically readable portion of said optically readable disk according to said magnetically recorded data or information read from said magnetically readable and writable portion of said disk.

The method of recording data or information on an optically readable disk in accordance with the present invention comprises the steps of rotating an optically readable disk having optically readable data or information recorded on an optically readable portion of said disk and having a magnetically readable and magnetically writable portion on said disk and magnetically writing data or information on said magnetically readable and writable portion of said disk.

The method of playing back a magneto-optical disk in accordance with the present invention comprises the steps of rotating a magneto-optically readable and writable disk having a plurality of digitized audio, normally musical, selections magneto-optically prerecorded on a first portion thereof and data or information relating to a desired playback sequence of said prerecorded musical selections magneto-optically recorded on a second portion of said magneto-optical disk and magneto-optically reading said prerecorded musical selections from said magneto-optical disk in said sequence recorded on said second portion of said disk.

Accordingly, it is an object of the present invention to provide an improved optically readable disk, an improved apparatus for playing back optically readable disks and an improved method of playing back optically readable disks.

Another object of the present invention is to provide an improved optically readable disk playback system which permits a desired sequence of playback of musical selections, or portions thereof, recorded on said optically readable disk to be stored on said disk so that when said disk is played back in a playback apparatus made in accordance with the present invention, said desired sequence of playback can be retrieved from said disk and executed by said playback apparatus.

A further object of the present invention is to provide an optically readable disk playback apparatus which can retrieve from said optically readable disk and can store on said optically readable disk data or information relating to user selectable playback parameters for said optically readable disk, such as a desired sequence for playing back portions of data or information optically recorded on said optically readable disk.

Another object of the present invention is to provide an optically readable disk which includes a magnetically readable and writable portion thereon.

Yet another object of the present invention is to provide an optically readable disk playback system which can erasably record data or information on said optically readable disk.

Another object of the present invention is to provide an optically readable disk playback system which can erasably store computer software related to the playback of said optically readable disk.

These and other objects, features and advantages of the present invention will become apparent after a review of the following detailed description of the preferred embodiments and the appended claims.

DETAILED DESCRIPTION OF THE PREFERRED EMBODIMENTS

Figure 1:
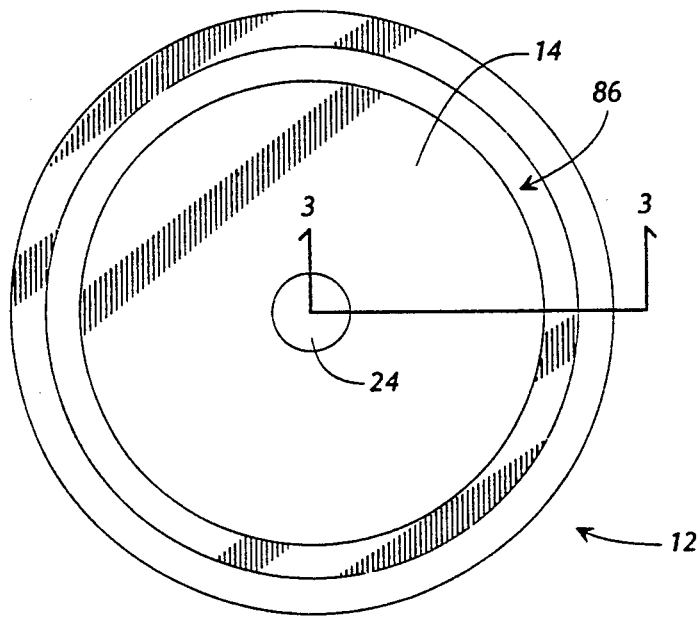
FIG. 1 is a plan view of a disclosed embodiment of the improved optically readable disk of the present invention.
Figure 3:
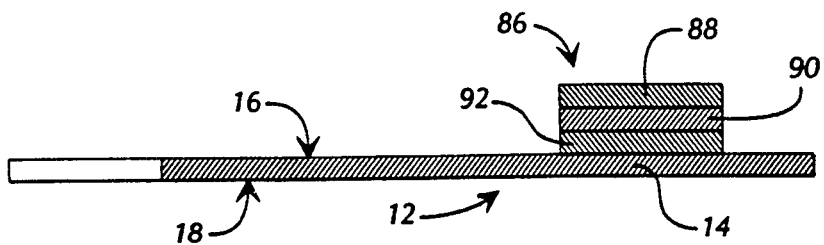
FIG. 3 is a cross-sectional view taken along the line 3—3 of the optically readable disk shown in FIG. 1.

With reference to the drawing in which like numbers indicate like elements throughout the several views, it can be seen that there is an optically readable disk player 10 (FIG. 6) for playing an improved optically readable disk 12 (FIG. 1). The optically readable portion of the optically readable disk 12 is of a conventional construction and is made in accordance with techniques well known in the art. The optically readable disk 12 generally includes a plastic body 14 having a top surface 16 and a bottom surface 18 (FIG. 3). The bottom surface 18 has recorded thereon optically readable data or information which is readable by conventional optically readable disk playback units which are well known in the art. Such optically readable disk playback units typically include a variable speed motor 20 drivably connected to a shaft or spindle 22 which is adapted to rotatably drive the optically readable disk 12 mounted thereon at a centrally located hole 24 in said disk. The speed of the motor 20 is controlled by a controller 26 connected to the motor by an electrical circuit 28. The controller 26 in turn is connected to a microprocessor 30 by an electrical circuit 32.

The optically readable disk player 10 also includes an optical pickup 34 which is positionable adjacent the bottom surface 18 of the optically readable disk 12 so that the data or information recorded on the bottom surface can be read by said optical pickup. Said optical pickup 34 typically includes a laser light source (not shown), optics (not shown) for focusing said laser light source on the bottom surface 18 of the disk 12 and a detector (not shown) for detecting the laser light reflected from the bottom surface 18 of the disk.

The optical pickup 34 is connected to a signal processor 36 by an electrical circuit 38. The signal processor converts or decodes the electrical signals from the optical pickup 34 into signals which are usable by another piece of electronic equipment (not shown) connected thereto at a signal output 40 connected to the signal processor by an electrical circuit 42. Such other pieces of electronic equipment include, for example, an audio amplifier of a stereo system, a video monitor or television, a computer and the like.

The optical pickup 34 is connected by a mechanical connection 44 to a servo mechanism 46, such as a stepper motor. The servo mechanism 46 is connected to the optical pickup 34 in such a way that it can move the optical pickup radially inwardly and outwardly with respect to said optically readable disk, such as in the directions shown at A. The servo 46 is connected to the microprocessor 30 by an electrical circuit 48. The microprocessor 30, through the servo 46, can therefore position the optical pickup 34 at desired location along the bottom surface 18 of the optically readable disk 12 so that the information recorded on various portions or tracks of said disk can be played back as desired.

The optical disk player 10 includes a control panel 50 having mounted therein a drawer 52 which slides in and out of the player's chassis, a program display 54, a playback control cluster 56 and a program selection control cluster 58. The drawer 52 is openable and closable to permit the loading and unloading of an optically readable disk into the player 10. Opening and closing of the drawer is controlled by an open/close button 60. The playback control cluster 56 includes a play button 62, a stop button 64, a fast forward button 66, a fast review button 68, a program advance button 70 and a program backup button 72.

The program display 54 includes alpha-numeric displays, such as LED or LCD displays, for displaying operating information, such as the track or selection number being played, elapsed time of play, playback sequence programming information and the like. The program selection control cluster 58 includes a plurality of key switches 74 for programming the sequence of playback of, for example, the different musical selections of an optically readable disk. The microprocessor 30 scans the program selection control panel 58 and drives the display 54.

The optical disk player 10 is capable of being programmed so that desired selections, tracks, indexes, times within a track number or absolute times can be played back in a desired sequence. For this purpose, the control panel 50 also includes a program button 76. Depressing the program button 76 tells the microprocessor (or microcomputer) 30 to execute the program mode. Typically, programming of optically readable disk players is performed by entering a desired selection number for play into a program slot which is stored in memory and played back sequentially. For example, there may be twenty available programmable slots numbered "1" through "20" each of which is stored in a program memory 78. Pressing the program button 76 causes the number "1" to be displayed in the display 54. Each programmable slot number can be programmed with a desired selection number, track number, index number or the like. Therefore, in order to program slot number "1," a selection number is entered by depressing the key switches 74 on the program selection control panel 58. When a key switch 74 is pressed, the selection is shown on the display 54. For example, if key switch "5" is pressed, a "5" would be shown on the display 54 in association with the programmable slot number "1" indicating that the first selection to be played would be selection number "5" from the disk. This information is then stored in the program memory 78 which is typically a volatile RAM memory unit.

A continue key 80 is provided to step the microprocessor 30 through its programming process. That is, when the continue key 80 is pressed, the next programmable slot is shown on the display and is made available for programming as described above. For example, when the continue button 80 is pressed, the number "2" corresponding to the second programmable slot would be shown on the display 54. A selection number can then be entered from the program selection control panel 58. If the number "3" key switch 74 is pressed, the selection number "3" will be shown on the display 54 in association with the slot number "2." This process is continued until all of the desired selections have been entered into the program memory 78 in the desired order. If it is desired to delete a selection, an erase key 82 is provided. Pressing the erase key 82 will delete the selection number from the displayed slot number and from the program memory 78. If it is desired to delete all selections, an erase all key 84 is provided. Pressing the erase all key 84 deletes all selections from the program memory 78.

When it is desired to execute the program in the program memory 78, that is play the selections on the optically readable disk in the sequence stored in the program memory, the play button 62 is pressed. In the example given above, pressing the play button would cause the fifth selection and the third selection on an optically readable disk inserted into the player 10 to be played back in that sequence. The programming of optically readable disk players in the above-described process is well known in the art.

The foregoing description of the optically readable disk 12 and the optically readable disk player 10 describes the construction of optically readable disks and players therefor which are well known in the art, such as those disclosed in U.S. Pat. Nos. 4,894,814; 4,740,938 and 4,779,252 (the disclosures of which are all incorporated herein by reference). The present invention departs from the construction and operation of such prior art optically readable disks and optically readable disk players as described further hereinbelow.

The optically readable disk 12 of the present invention differs from conventional prior art optically readable disks in that the disk of the present invention includes a magnetically readable and magnetically writable portion defined thereon. As shown in FIG. 1, the magnetically readable and magnetically writable portion of the disk 12 comprises an annular ring 86 defined on the top surface 16 of the disk. The magnetically readable and magnetically writable portion 86 comprises a magnetically readable and magnetically writable media layer 88, such as a ferrous oxide layer. The specific nature of the magnetically readable and writable media layer 88 is not critical to the present invention. Any coating which allows magnetically recording digital signals on the media layer 88, magnetically reading those signals from the media layer and magnetically erasing the signals from the media layer is useful in the present invention. A magnetic readable and writable portion such as is found on bank cards or credit cards is specifically contemplated as being useful in the present invention.

The magnetically readable and writable media layer 88 is supported on a support layer 90, such as a plastic film. It is well known in the art to apply magnetically readable and writable coatings to plastic films, such as is done in the manufacture of magnetic audio or digital recording tape. The specific composition of the support layer 90 is not critical to the invention and may be of a conventional plastic used for recording tape, such as polyethylene, polypropylene, polyvinyl chloride, or the like. The support layer 90 can also be made of any relatively rigid material, such as paper, so as to provide sufficient support for the magnetic media layer 88. The application of magnetically readable and writable layers on paper is also well known in the art.

The support layer 90 is adhered to the top surface 16 of the disk 12 by an adhesive layer 92, preferably a pressure sensitive adhesive. Many suitable adhesives and pressure sensitive adhesives are well known in the art and are suitable for adhering the support layer 90 to the disk 12.

Figure 4:
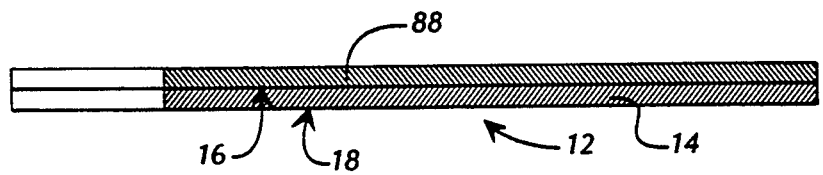
FIG. 4 is a cross-sectional view taken along the line 3—3 of an alternate embodiment of the optically readable disk shown in FIG. 3.

Alternately, as shown in FIG. 4, the magnetically readable and writable media layer 88 can be deposited directly on the top surface 16 of the disk 12. The media layer 88 can cover the entire top surface 16 of the disk 12, as shown in FIG. 4, or the media layer can cover only a portion of the surface, such as in a band or ring, such as shown in FIG. 1. The particular geometric configuration of the magnetically readable and writable portion 86 of the disk 12 is not critical to the present invention; however a ring or band, as shown in FIG. 1, is preferred. The width of the band or ring is also not critical. However, a wider band or ring of the magnetically readable and writable portion 86 provides for a greater amount of data or information which can be recorded thereon and read therefrom.

In still another embodiment (not shown), the magnetically readable layer 88 can be embedded in the plastic material from which the disk 12 is made. Embedding the magnetically readable layer 88 in the disk 12 has the advantage of protecting the magnetically readable layer from wear and damage. In addition to mounting the magnetically readable and writable portion 86 to the top surface 16 of the disk 12, the magnetically readable and writable portion can also be located on the edge of the disk. Furthermore, the location of the magnetically readable and writable portion 86 on the top surface 16 of the disk 12 is not critical for optically readable disk having optically readable data or information optically recorded on only the bottom surface 18 of the disk 12. However, for optically readable disks having optically readable data or information recorded on both the top surface and the bottom surface of the disk, the size and location of the magnetically readable and writable portion 86 is more critical. Most optically readable disks have a portion of their surface which does not include optically readable data or information, such as a portion adjacent the outer edge of the disk, adjacent the central hole in the disk or on the edge of the disk. In such cases, the magnetically readable and writable portion 86 should be located on the disk so that it does not obscure the optically readable data or information recorded on said disk.

In a preferred embodiment, the magnetically readable and writable portion 86 is applied to the disk 12 at the time the disk is manufactured. However, it is specifically contemplated by the present invention that previously manufactured optically readable disks of the prior art can be converted to optically readable disks in accordance with the present invention. It is contemplated that the magnetic media layer 88, the support layer 90 and the pressure adhesive layer 92 can be separately manufactured as a unit. The magnetic media layer 88, support layer 90 and pressure sensitive adhesive layer 92 can be temporarily adhered to a backing layer (not shown), such as waxed paper, from which the three layers can be removed. The magnetic media layer 88, support layer 90 and adhesive layer 92 can then be peeled from the backing layer and the adhesive layer 92 brought into contact with the upper surface 16 of the disk 12 after proper alignment of the ring of magnetic material with the disk. By applying pressure to the three layers of material 88-92, the magnetic portion 86 can be applied to a conventional optically readable disk. Such a converted disk can then be used in accordance with the present invention. The ability to easily convert optically readable disks of the prior art to the optically readable disk of the present invention makes the present invention widely applicable to the wide base of optically readable disks already manufactured.

Figure 2:
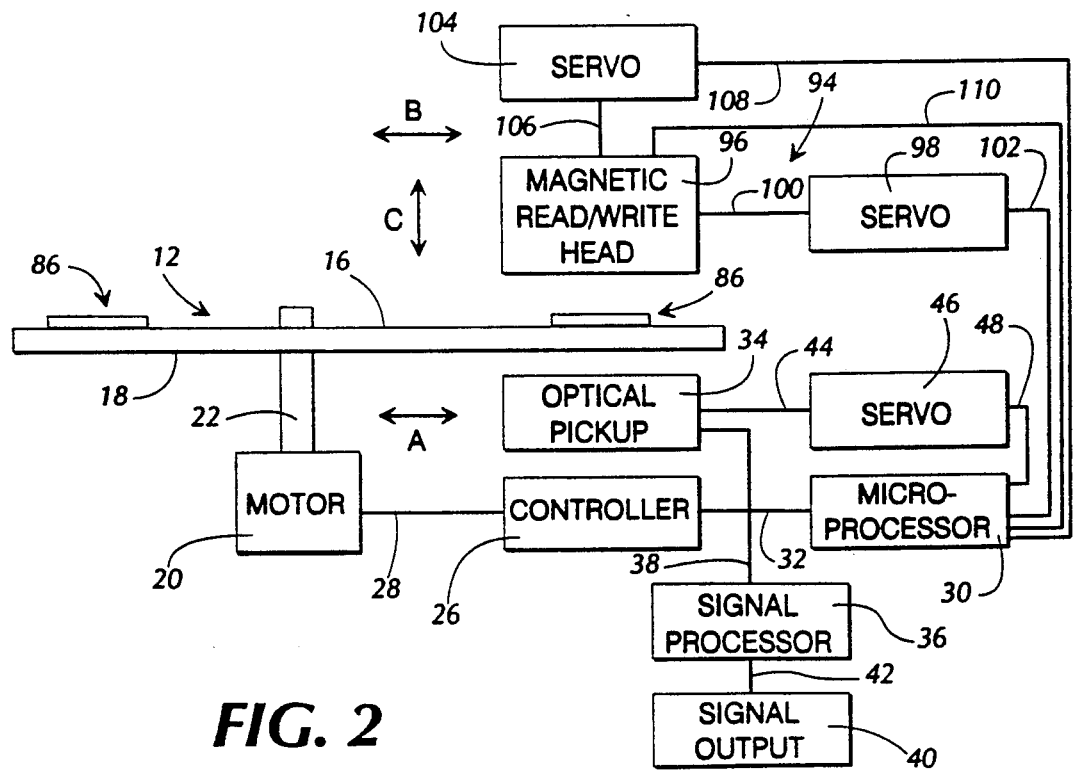
FIG. 2 is a block diagram of a disclosed embodiment of the improved optically readable disk playback system of the present invention.

The optically readable disk player 10 of the present invention differs from the prior art in that the player of the present invention includes a magnetic read/write unit 94 (FIG. 2), such as a conventional floppy disk drive, positioned above the optically readable disk 12 mounted on the spindle 22. The magnetic read/write unit 94 comprises a magnetic read/write head 96 connected to a servo mechanism 98, such as a stepper motor, by a mechanical connection 100. The servo mechanism 98 is connected to the microprocessor 30 by an electric circuit 102. The servo mechanism 98 is connected to the magnetic read/write head 96 in such a way that it can move the magnetic read/write head radially inwardly and outwardly with respect to said optically readable disk 12, such as in the directions shown at B. The magnetic read/write head is positionable above the magnetic portion 86 of the optically readable disk 12 so that the magnetic read/write head is operative to record magnetic signals from the magnetic portion of the disk and to read magnetic signals from the magnetic portion of the disk as the disk is rotated. The servo mechanism 98 is controllable by the microprocessor 30 so as to position the magnetic read/write head 96 radially inwardly and outwardly with respect to the disk 12 so that one or more tracks of magnetic data or information can be recorded on and/or read from the magnetic portion 86 of the disk.

Preferably, the magnetic read/write head 96 is also connected to another servo mechanism 104 by a mechanical connection 106. The servo mechanism is connected to the microprocessor 30 by an electric circuit 108. The servo mechanism 104 is connected to the magnetic read/write head 96 is such a way that it can move the magnetic read/write head toward the optically readable disk 12 and away from the disk, such as in the directions shown at C. The servo mechanism 104 is controllable by the microprocessor 30 so as to position the magnetic read/write head 96 toward and away from the disk 12 so that the magnetic read/write head can be moved into a first position suitable to write signals to and read signals from the magnetic portion 86 of the disk and can be moved away from the disk to a second retracted position which would not interfere with the free rotation, insertion and removal of the disk.

The magnetic read/write head 96 is connected to the microprocessor 30 by an electric circuit 110 in such a way that signals read from the magnetic portion 86 of the disk 12 by the magnetic read/write head 96 are sent to the microprocessor and the microprocessor can send signals to the magnetic read/write head for recording on the magnetic portion of the disk. The microprocessor 30 is also connected to the motor 20 and controller 26 so that the speed of the disk can be controlled by the microprocessor for proper writing of magnetic signals to and reading of magnetic signals from the magnetic portion 86 of the disk by the magnetic read/write head 96. The microprocessor 30 includes suitable software known in the art for reading the signals from and sending signals to the magnetic read/write head 96 so that data or information can be recorded on and read from the magnetic portion 86 of the disk 12 by the microprocessor. The microprocessor 30 also includes suitable software known in the art for positioning the magnetic read/write head 96 in operative positions to read magnetic signal from and write magnetic signals to the magnetic portion 86 of the disk 12 and to control the speed of the disk.

Figure 6:
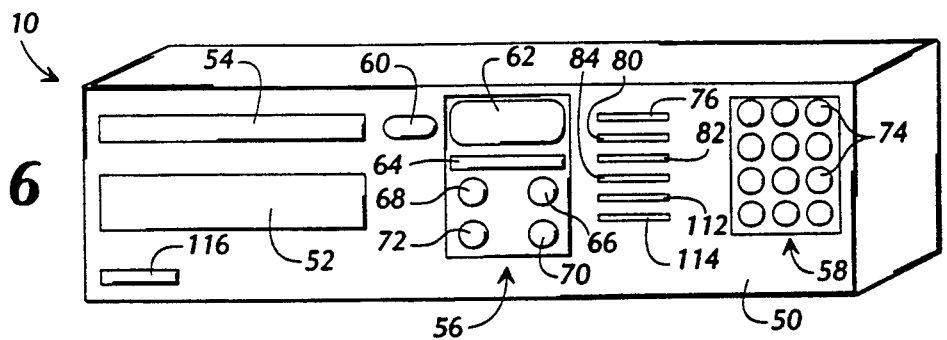
FIG. 6 is a perspective view of a disclosed embodiment of the optically readable disk player of the present invention.
Figure 7:
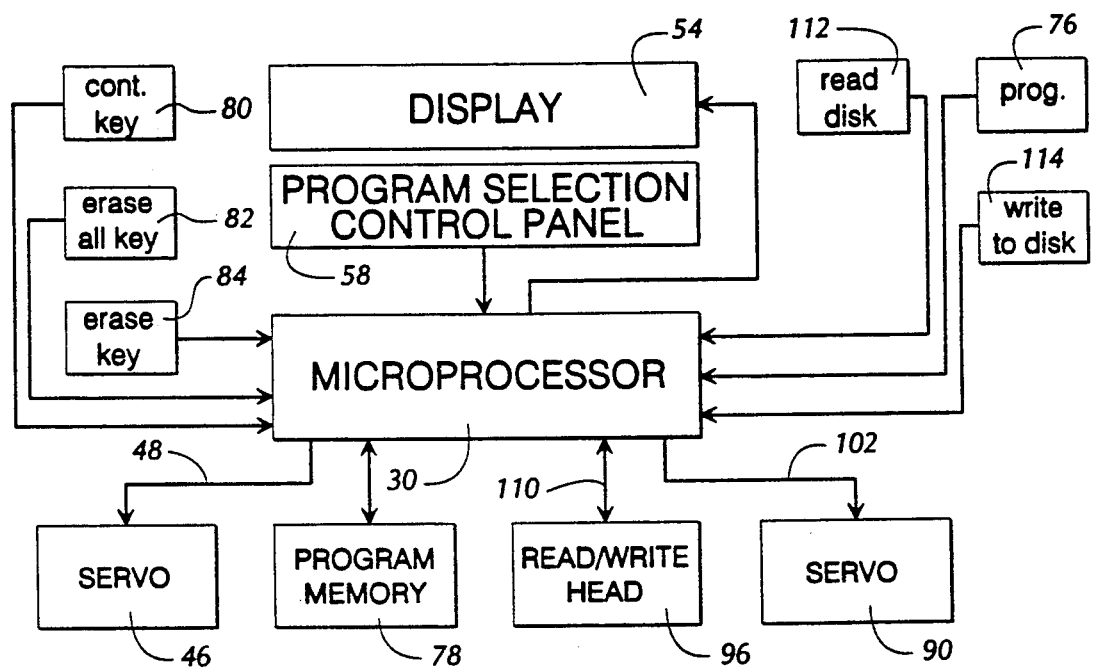
FIG. 7 is a block diagram of the optically readable disk player shown in FIG. 6.

The optically readable disk player 10 includes a disk read button 112 (FIGS. 6 and 7). Pressing the disk read button 112 causes the microprocessor 30 to move the magnetic read/write head 96 from its retracted position (away from the disk 12) to the position (FIG. 2) for reading the signals from the magnetic portion 86 of the disk by actuating the servo mechanism 104. The microprocessor 30 also positions the magnetic read/write head 96 radially over the magnetic portion 86 of the disk 12 by actuating the servo mechanism 98 and adjusts the speed of the disk through the controller 26 and motor 20. The magnetic read/write head 96 then reads the data or information recorded on the magnetic portion 86 of the disk 12 and sends it to the microprocessor 30 via the circuit 110. The microprocessor 30 stores the data or information read from the magnetic portion 86 of the disk 12 in the program memory 78 for later use by the microprocessor. After the data or information has been read from the magnetic portion 86 of the disk 12, the microprocessor 30 moves the magnetic read/write head 96 back to the retracted position by again actuating the servo mechanism 104.

The optically readable disk player 10 also includes a write to disk button 114 (FIGS. 6 and 7). Pressing the write to disk button 114 causes the microprocessor 30 to move the magnetic read/write head 96 from its retracted position to the position for writing signals to the magnetic portion 86 of the disk 12 by actuating the servo mechanism 104. The microprocessor 30 also positions the magnetic read/write head 96 radially over the magnetic portion 86 of the disk 12 by actuating the servo mechanism 98 and adjusts the speed of the disk through the controller 26 and motor 20. The magnetic read/write head 96 then writes the data or information stored in the program memory 78 to the magnetic portion 86 of the disk 12. After the data or information has been recorded on the magnetic portion 86 of the disk 12, the microprocessor 30 moves the magnetic read/write head 96 back to the retracted position by again actuating the servo mechanism 104.

Operating and use of the optically readable disk and optically readable disk player will now be considered. The optically readable disk player 10 is connected to a suitable power source and turned on by pressing the power switch 116. A conventional optically readable disk, such as Gloria Estefan and the Miami Sound Machine's compact disk "Let It Loose" is selected for playback. This compact disk includes ten different selections recorded on the disk in the following order: "Betcha Say That," "Let It Loose," "Can't Stay Away From You," "Give It Up," "Surrender," "Rhythm Is Gonna Get You," "Love Toy," "I Want You So Bad," "1-2-3" and "Anything For You."

A ring of magnetic material comprising the magnetic media layer 88, the support layer 90 and the pressure sensitive adhesive layer 92 is applied to the top surface 16 of the "Let It Loose" compact disk so that it resembles the disk 12 shown in FIG. 1. The open/close button 60 of the disk player 10 is pressed and the drawer 52 slides out of the disk player. The "Let It Loose" disk 12 is placed in the drawer 52 of the disk player 10 and the open/close button 60 is pressed again causing the drawer to close. The disk 12 is then inside the disk player and is ready for playback. Pressing the play button 62 causes the disk player 10 to play the ten selections on the "Let It Loose" disk 12 in the exact order that they were recorded on the disk when it was manufactured. If it is desired to play those selections in a different order, to skip certain selections or to play certain selections more than once, the disk player 10 can be programmed with the desired playback sequence and that sequence stored on the magnetic portion 86 of the "Let It Loose" disk 12 so that when that disk is played again, in the same or a different disk player, the desired playback sequence can be recalled from the disk. The programming and storage of that program on the disk are discussed below in relation to the flow diagram shown in FIG. 5.

Figure 5:
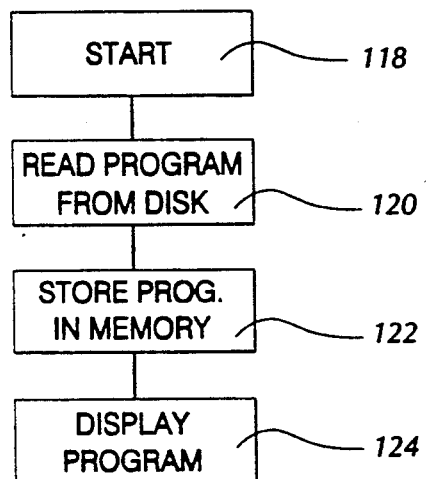
FIG. 5 is a flow diagram for operation of a controller of a disclosed embodiment of the optically readable disk playback system of the present invention.
Figure 5:
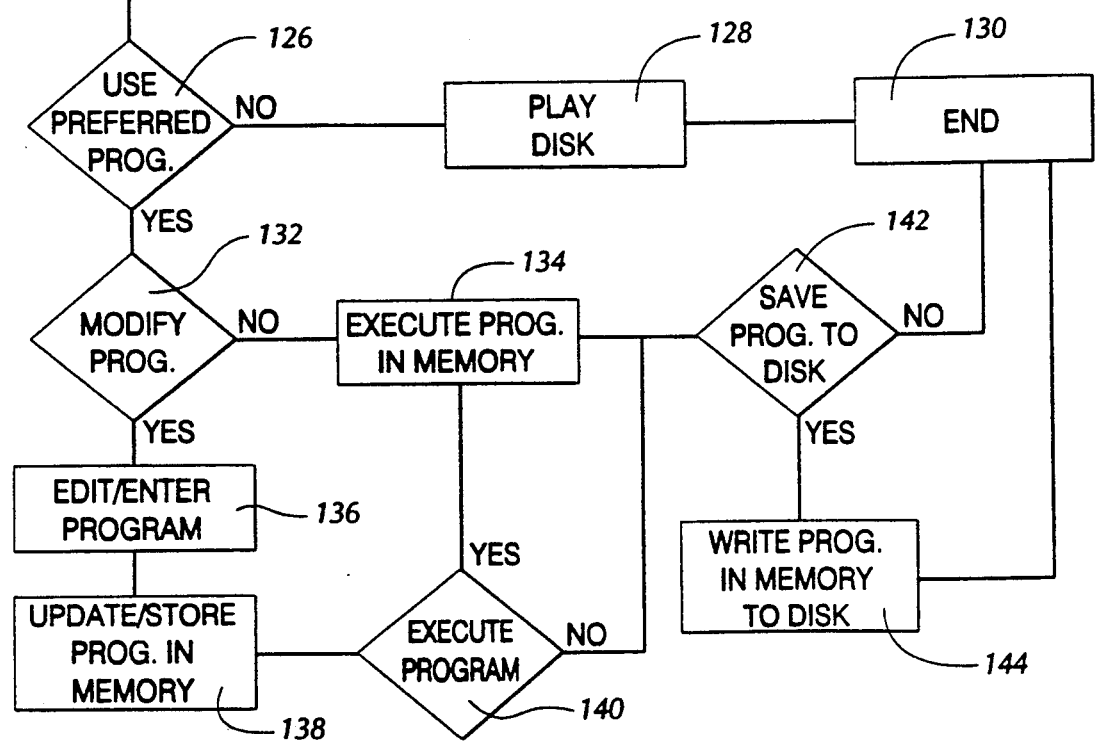

To begin the programming process, one starts at the start block 118 of the flow diagram (FIG. 5). The programming information stored on the magnetic portion 86 of the "Let It Loose" disk 12 is read, such as at block 120, by pressing the read disk button 112. This causes the magnetic read/write head 96 to read the program information stored on the magnetic media layer 88 of the magnetic portion 86 of the disk 12. Reading of the disk program can also be programmed in the microprocessor 30 so that the program is read from the disk 12 automatically when the disk is inserted into the player 10.

The program information read from the magnetic media layer 88 of the disk 12 is then stored in the program memory 78, as shown at block 122. The program stored in the program memory 78 is then shown on the display 54, as indicated at block 124. Initially only the first portion of the program can be shown in the display 54, however, the entire program can be reviewed in the display by repeatedly pressing the continue button 80. Since the magnetic portion 86 of the "Let It Loose" disk 12 does not contain a program, nothing is read from the magnetic portion of the disk and no program is shown in the display 54.

The user then has the choice, such as at block 126, of either playing the disk 12 as originally recorded or by entering a desired playback sequence into the player 10. If it is desired to merely play the disk 12 as originally recorded, such as shown at block 128, the play button 62 is pressed. When the disk 12 has finished playing, the player 10 stops, such as shown at block 130. However, if one desires to enter a desired program, the program button 76 is pressed.

Returning to block 126, if the disk 10 in the player had contained program information on the magnetic portion 86 of the disk, one would at this point have the option of either modifying the program stored in the program memory 78 or executing the program in the program memory, as shown at block 132. Execution of the stored program is accomplished by pressing the program button 76 followed immediately by pressing the play button 62. This button sequence causes the disk 10 to be played back according to the program sequence stored in the program memory 78, as shown at block 134.

If it were desired to use the program sequence stored in the program memory 78, but some changes in the program were desired, such as shown at block 136, one would press the program button 76 and then make the desired changes in the program by pressing the continue button 80 to step through the program shown in the display 54 and by pressing the appropriate key switches 74 to enter the desired selection numbers in the desired program slot numbers. These changes in the desired program would then be stored in the program memory 78 as they were made, as shown at block 138.

After the desired changes are made to the program stored in the program memory 78, the user is given the option of executing the modified program, such as shown at block 140. The modified program is executed by pressing the play button 62 which executes the program sequence stored in the program memory 78 by playing the disk selections in the stored program sequence, as shown at block 134.

After the disk has finished playing, the user has the option of storing the modified program on the magnetic portion 86 of the disk, such as shown at block 142. If it is not desired to store the modified program on the magnetic portion 86 of the disk 12, the open/close button 60 is pressed and the disk is removed from the drawer 52 and the operating sequence ends, as shown at block 130. However, if it is desired to store the modified program on the magnetic portion 86 of the disk 12, the write to disk button 114 is pressed. Pressing the write to disk button causes the contents of the program memory 78 to be recorded on the magnetic portion 86 of the disk 12, as shown at block 144, overwriting the information which was previously recorded on the magnetic portion of the disk, if any. Alternately, at block 140, if the user does not wish to execute the modified program in the program memory 78, the option is given for storing the modified program on the magnetic portion 86 of the disk 12. The program can be so stored on the disk by pressing the write to disk button 114. The process proceeds from block 144 as described above.

Because the "Let It Loose" disk contained no program information on the magnetic portion 86 of the disk 12, at block 126, the program button 76 is pressed. The desired program is entered into the program memory 78 by stepping through the programming process by pressing the continue button 80 and the desired key switches 74 on the program selection control panel 58. For example, when the program button 76 is pushed, the first programmable slot of the program memory 78 is made available for programming. A "1" is shown in the display 54 to indicate that the first program slot is to be programmed. If it is desired to play the selection "Rhythm Is Gonna Get You" first, the key switch 74 corresponding to the number "6" is pressed because that song is the sixth selection on the "Let It Loose" disk 12. To program the next programmable slot of the program memory 78, the continue button 80 is pressed. The display 54 then change to show a "2" as the programmable slot of the program memory 78 which is available for programming. If it is desired to play the selection "Give It Up" as the second selection to be played, the key switch 74 corresponding to the number "4" is pressed because that song is the fourth selection on the "Let It Loose" disk 12. This process is continued until all of the desired selections in the desired sequence are entered into the program memory 78.

If it is now desired to play the "Let It Loose" disk 12 in the desired program sequence, as shown at block 140, the play button 62 is pressed. The selections from the disk 12 are then played in the sequence programmed into the program memory 78, as shown at block 134. The program stored in the program memory 78 can also be stored on the magnetic portion 86 of the "Let It Loose" disk 12 as described previously with respect to blocks 142, 144.

As can be seen from the foregoing, a desired program playback sequence can be magnetically stored on the magnetic portion 86 of an optically readable disk 12 and can be recalled from that disk for reuse. In this way, a desired program sequence need only be entered once and stored on the disk 12 itself rather than having to reprogram a disk player each time a different disk is inserted. Furthermore, if the disk 12 is played back in a different disk player made in accordance with the present invention, such as a disk player in an automobile, no additional programming is needed because the program follows the disk and is not unique to the disk player.

Additionally, although the present invention has been described as being useful for storing a desired playback sequence for an optically readable disk, it is also specifically contemplated that other data or information can be stored on the magnetic portion 86 of the disk 12. For example, information relating to a desired playback volume setting, equalization setting or the like for a particular selection on an optically readable disk 12 can be stored on the magnetic portion of the disk.

Figure 8:
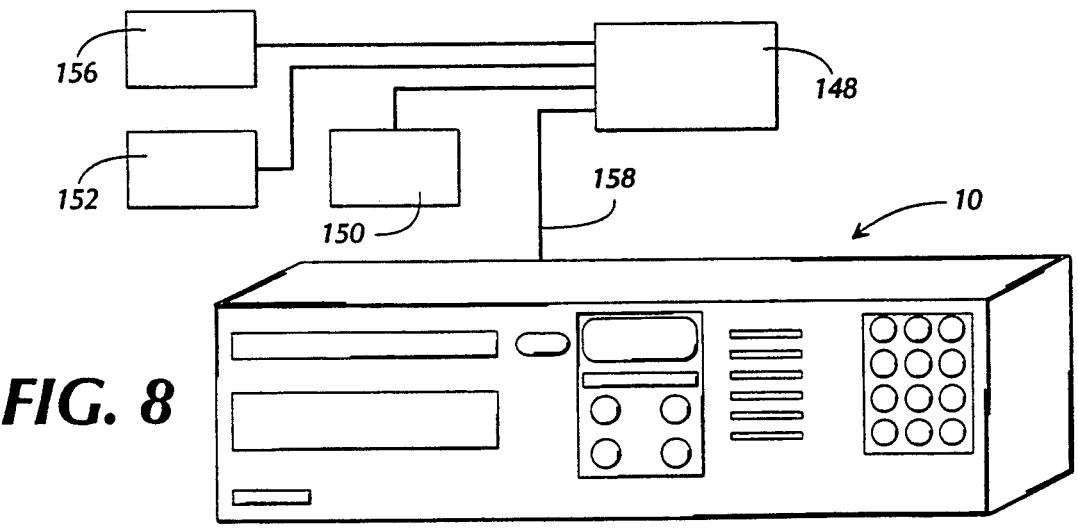
FIG. 8 is a schematic diagram of an alternate disclosed embodiment of the optically readable disk playback system of the present invention.

As shown in FIG. 8, the optically readable disk player 10 of the present invention is connected to a stereo amplifier 148 equipped with a microprocessor control 150 for the volume control 152 and the equalization controls 154. The microprocessor 30 of the optically readable disk player 10 is connected to the microprocessor 150 of the stereo system 148 by an electric circuit 158. Playback parameters relating to volume control settings and equalization settings are stored on the magnetic portion 86 of the disk 12 in the same manner that selection sequences are stored. When the playback parameters are read from the magnetic portion 86 of the disk 12 by the microprocessor 30 of the disk player 10, those parameters are then passed to the microprocessor 150 of the stereo system 148 which in turn effects the desired changes to the volume control 152 and the equalization control 156. Alternately, the microprocessor 30 of the optically readable disk player 10 can be connected by an electric circuit (not shown) to the volume control 150 and equalization control 152. The microprocessor 30 can then adjust the volume control 152 and equalization control 152 without the need for the additional microprocessor 150. The present invention therefore permits any desired playback parameter for an optically readable disk to be stored and retrieved at a later time from an optically readable disk.

Although the present invention has been described as being particularly useful in the playback of musical compact disks, it is also specifically contemplated that the present invention can be used with CD-ROMs and laser disks. The microprocessor 30 of the optically readable disk player 10 can be connected to the processor of a computer. Various information relating to the CD-ROM can therefore be magnetically stored on the disk, such as computer software, search routines, portions of the optically recorded information, and the like. This information can then be retrieved from the optically readable disk and made accessible to the computer by connection to the microprocessor 30 of the player 10. The disk player 10 can also be connected to video monitors, televisions, video tape recorders, other optically readable disk players, slide projectors and the like which can be controlled by the microprocessor 30 of the disk player.

Finally, the present invention has been described as being useful with all types of optically readable disks. This is specifically contemplated to include magneto-optical disks. U.S. Pat. No. 4,862,439 (the disclosure of which is incorporated herein by reference) discloses a magneto-optical disk and magneto-optical disk player. The disk and player are designed for both recording and playing back digitized audio information, such as musical information. It is contemplated that when a magneto-optical disk and player are used in the present invention that the data or information which would be magnetically stored on a magnetic portion of the disk would instead be stored magneto-optically on a portion of the magneto-optical disk. The playback sequence information can be magneto-optically recorded in the lead-in section of the magneto-optical disk just as the table of contents information is recorded on said disk. The microprocessor 30 of the magneto-optical disk player 10 can then be programmed to retrieve the playback sequence information from the lead-in section, or other section, of the magneto-optical disk in the same way that such information is retrieved from the magnetic portion 86 of the disk 12. Operation of the method of playing back the magneto-optical disk of the present invention would otherwise be unchanged.

In order to convert the optically readable disk player 10 described above into a magneto-optical disk player and recorder, obvious changes in the construction of the optically readable disk player 10 of the present invention are made in accordance with the disclosure of U.S. Pat. No. 4,862,439. The magnetic read/write head 96 and the servo mechanism 98 are not necessary. Changes in the programming of the microprocessor 30 to magneto-optically read and write the desired program sequence information and/or program play back parameter information on a portion of the magneto-optical disk, instead of on the magnetically readable and writable portion 86 are also made. Operation of the magneto-optical disk player in accordance with the flow diagram shown in FIG. 5 remains unchanged.

It should be understood, of course, that the foregoing relates only to certain disclosed embodiments of the present invention and that numerous modifications or alterations may be made therein without departing from the spirit and scope of the invention as set forth in the appended claims.

I claim:

1. A method of playing back an optically readable disk comprising the steps of:
    rotating an optically readable disk having first optically readable signals recorded on a first portion of said disk and having a second readable and writable portion on said disk;
    recording second signals on said second portion of said disk, said second signals defining playback parameters for said first signals, said playback parameters being selected from the group consisting of audio equalization, audio volume, video color balance, video contrast and video brightness;
    reading said second signals from said second portion of said disk;
    adjusting reproduction apparatus in response to said playback parameters read from said second portion of said disk so that said first signals will be reproduced in accordance with said playback parameters; and
    reading said first signals from said first portion of said disk and playing back said signals through said reproduction apparatus in accordance with said playback parameters read from said second portion of said disk.

2. The method of claim 1, wherein said second signals are recorded on said second portion of said disk magneto-optically.

3. A method of playing back an optically readable disk comprising the steps of:
    rotating an optically readable disk having first optically readable signals recorded on a first portion of said disk and having second readable signals on a second portion on said disk, said second signals corresponding to playback parameters for said first signals, said playback parameters being selected from the group consisting of audio equalization, audio volume, video color balance, video contrast and video brightness;
    reading said second signals from said second portion of said disk;
    adjusting reproduction apparatus in response to said playback parameters read from said second portion of said disk so that said first signals will be reproduced in accordance with said playback parameters; and
    reading said first signals from said first portion of said disk and playing back said signals through said reproduction apparatus in accordance with said playback parameters read from said second portion of said disk.

4. A method of playing back an optically readable disk comprising the steps of:
    rotating an optically readable disk having first optically readable signals recorded on a first portion of said disk and having a second readable and writable portion on said disk;
    recording second signals on said second portion of said disk, said second signals defining playback parameters for said first signals, said playback parameters being selected from the group consisting of audio playback parameters, video playback parameters and a combination thereof;
    reading said second signals from said second portion of said disk;
    adjusting reproduction apparatus in response to said playback parameters read from said second portion of said disk so that said first signals will be reproduced in accordance with said playback parameters;
    said reproduction apparatus being selected from the group consisting of audio reproduction apparatus, video reproduction apparatus and a combination thereof; and
    reading said first signals from said first portion of said disk and playing back said signals through said reproduction apparatus in accordance with said playback parameters read from said second portion of said disk.

5. A method of playing back an optically readable disk comprising the steps of:
    rotating an optically readable disk having first optically readable signals recorded on a first portion of said disk and having a second readable and writable portion on said disk, said signals on said first portion of said disk defining a plurality of separately reproducible selections;
    recording second signals on said second portion of said disk, said second signals defining a playback sequence for said plurality of selections;

recording third signals on said second portion of said disk, said third signals defining playback parameters for said first signals, said playback parameters being selected from the group consisting of audio playback parameters, video playback parameters and a combination thereof;

reading said second and third signals from said second portion of said disk;

reading said first signals from said first portion of said disk and playing back said plurality of selections through reproduction apparatus in accordance with said playback sequence read from said second portion of said disk; and adjusting said reproduction apparatus in response to said playback parameters read from said second portion of said disk so that said first signals are reproduced in accordance with said playback parameters, said reproduction apparatus being selected from the group consisting of audio reproduction apparatus, video reproduction apparatus and a combination thereof.

6. The method of claim 5, wherein at least one of said playback parameters is associated with each of said plurality of selections and for each of said plurality of selections played back in said playback sequence, adjusting said reproduction apparatus so that each of said plurality of selections is reproduced in accordance with said playback parameter associated with said selection.

7. A method of playing back an optically readable disk comprising the steps of:

rotating an optically readable disk having optically readable signals recorded on a portion of said disk, said signals on said portion of said disk defining a plurality of separately reproducible selections;

retrieving from a storage medium at least one predetermined playback parameter for said selections, said playback parameter being selected from the group consisting of audio playback parameters, video playback parameters and a combination thereof;

adjusting reproduction apparatus in response to said playback parameter so that said first signals will be reproduced in accordance with said playback parameter;

said reproduction apparatus being selected from the group consisting of audio reproduction apparatus, video reproduction apparatus and a combination thereof; and reading said signals from said disk and playing back said plurality of selections through said reproduction apparatus in accordance with said retrieved playback parameter.

8. The method of claim 7, wherein said playback parameters are selected from the group consisting of audio equalization, audio volume, video color balance, video contrast and video brightness.

9. The method of claim 7 further comprising the steps of:

retrieving from a storage medium a predetermined playback sequence for said selections; and playing back said plurality of selections through said reproduction apparatus in accordance with said retrieved playback sequence.

10. The method of claim 9 wherein at least one of said playback parameters is associated with each of said plurality of selections and for each of said plurality of selections played back in said playback sequence, adjusting said reproduction apparatus so that each of said plurality of selections is reproduced in accordance with said playback parameter associated with said selection.

11. An improved audio reproduction system comprising:

an optical disk transport for rotating an optical disk;

an optical detector for reading first optical signals from a first portion of a disk in said transport;

said optical detector also being for reading second signals from a second portion of a disk in said transport;

audio reproduction apparatus associated with said optical detector for audibly reproducing said first signals, said audio reproduction apparatus comprising an audio volume control and an audio equalization control;

a controller operatively associated with said optical detector and said audio reproduction apparatus, such that second signals can be read from said second portion of said disk, said second signals being selected from the group consisting of audio equalization parameters and audio volume parameters, whereby said second signals can be used by said controller to adjust said audio reproduction apparatus such that said second signals affect the manner in which said first signals are reproduced by said audio reproduction apparatus.

12. The improved audio reproduction system of claim 11, wherein said optical detector is a magneto-optical read/write head for reading said second signals from and writing said second signals to said second portion of a magneto-optically readable/writable disk.

13. An improved video reproduction system comprising:

an optical disk transport for rotating an optical disk;

an optical detector for reading first optical signals from a first portion of a disk in said transport;

said optical detector also being for reading second signals from a second portion of a disk in said transport;

video reproduction apparatus associated with said optical detector for visually reproducing said first signals, said video reproduction apparatus comprising a brightness control, a color balance control and a contrast control;

a controller operatively associated with said optical detector and said video reproduction apparatus, such that second signals can be read from said second portion of said disk, said second signals being selected from the group consisting of video brightness parameters, video color balance parameters and video contrast parameters, whereby said second signals can be used by said controller to adjust said video reproduction apparatus such that said second signals affect the manner in which said first signals are reproduced by said video reproduction apparatus.

14. The improved video reproduction system of claim 13, wherein said optical detector is a magneto-optical read/write head for reading said second signals from and writing said second signals to said second portion of a magneto-optically readable/writable disk.

15. An improved audio reproduction system comprising:

an optical disk transport for rotating an optical disk;

an optical detector for reading first optical signals from a first portion of a disk in said transport;

said optical detector also being for reading second signals from a second portion of a disk in said transport;

audio reproduction apparatus associated with said optical detector for audibly reproducing said first signals;

a controller operatively associated with said optical detector and said audio reproduction apparatus, such that second signals can be read from said second portion of said disk, said second signals comprising audio playback parameters, whereby said second signals can be used by said controller to adjust said audio reproduction apparatus such that said second signals affect the manner in which said first signals are reproduced by said audio reproduction apparatus.

16. An improved video reproduction system comprising:

an optical disk transport for rotating an optical disk;

an optical detector for reading first optical signals from a first portion of a disk in said transport;

said optical detector also being for reading second signals from a second portion of a disk in said transport;

video reproduction apparatus associated with said optical detector for visually reproducing said first signals;

a controller operatively associated with said optical detector and said video reproduction apparatus, such that second signals can be read from said second portion of said disk, said second signals comprising video playback parameters, whereby said second signals can be used by said controller to adjust said video reproduction apparatus such that said second signals affect the manner in which said first signals are reproduced by said video reproduction apparatus.

17. An optically readable disk comprising:

a disk body;

a first portion of said disk body including first signals optically readable therefrom; and a second portion of said disk body including second signals readable therefrom, said second signals corresponding to playback parameters for said first signals, said playback parameters being selected from the group consisting of audio playback parameters, video playback parameters and a combination thereof, such that said second signals read from said second portion of said disk can be used to adjust apparatus for reproduction of said first signals such that said second signals affect the manner in which said first signals are reproduced by said reproduction apparatus, said reproduction apparatus being selected from the group consisting of audio reproduction apparatus, video reproduction apparatus and a combination thereof.

18. The optically readable disk of claim 17, wherein said playback parameters are selected from the group consisting of audio equalization, audio volume, video color balance, video contrast and video brightness.

19. The optically readable disk of claim 17, wherein said first signals comprise a plurality of separately reproducible musical selections.

20. An optically readable disk comprising:

a disk body;

a first portion of said disk body including first signals optically readable therefrom, said first signal defining a plurality of separately reproducible selections;

a second portion of said disk body including second signals readable therefrom, said second signals corresponding to a playback sequence for said selections, such that said second signals read from said second portion of said disk can be used to adjust apparatus for reproducing said first signals such that said second signals affect the sequence in which said selections are reproduced by said reproduction apparatus; and said second portion of said disk body including third signals readable therefrom, said third signals corresponding to playback parameters for said first signals, such that said third signals read from said second portion of said disk can be used to adjust apparatus for reproducing said first signals such that said third signals affect the manner in which said first signals are reproduced by said reproduction apparatus, said third signals being selected from the group consisting of audio playback parameters, video playback parameters and a combination thereof.

* * * * *